United States Patent
Jiang et al.

(10) Patent No.: US 9,263,930 B2
(45) Date of Patent: Feb. 16, 2016

(54) ELECTRIC MACHINE HAVING MAGNETIC POLES INCLUDING A PRIMARY MAGNET AND AUXILIARY MAGNETS

(75) Inventors: Mao Xiong Jiang, Shenzhen (CN); Yue Li, Hong Kong (CN); Jian Zhao, Shenzhen (CN); Yong Li, Shenzhen (CN); Yu Hong Guo, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 266 days.

(21) Appl. No.: 13/053,755

(22) Filed: Mar. 22, 2011

(65) Prior Publication Data

US 2011/0227439 A1    Sep. 22, 2011

(30) Foreign Application Priority Data

Mar. 22, 2010  (CN) .......................... 2010 1 0130858

(51) Int. Cl.
*H02K 23/04* (2006.01)

(52) U.S. Cl.
CPC ....................................... *H02K 23/04* (2013.01)

(58) Field of Classification Search
CPC ................................. H02K 23/04; H02K 1/17
USPC ........................................ 310/154.01–154.49
See application file for complete search history.

(56) References Cited

U.S. PATENT DOCUMENTS

| | | | |
|---|---|---|---|
| 3,594,599 A * | 7/1971 | West | 310/164 |
| 3,768,054 A * | 10/1973 | Neugebauer | 335/304 |
| 3,939,371 A * | 2/1976 | Murakami | 310/154.28 |
| 4,110,718 A * | 8/1978 | Odor et al. | 335/296 |
| 4,216,400 A * | 8/1980 | Lynch et al. | 310/154.24 |
| 4,417,167 A | 11/1983 | Ishii et al. | |
| 4,453,097 A * | 6/1984 | Lordo | 310/154.07 |
| 4,516,046 A * | 5/1985 | Mercier | 310/154.11 |
| 4,554,474 A * | 11/1985 | Morishita et al. | 310/154.26 |
| 4,727,273 A * | 2/1988 | Tanaka | 310/154.29 |
| 5,083,054 A * | 1/1992 | Tomite et al. | 310/154.26 |
| 5,206,556 A * | 4/1993 | Hayakawa | 310/154.28 |
| 5,742,110 A * | 4/1998 | Hefner | 310/154.45 |
| 5,949,169 A * | 9/1999 | Niimi | 310/154.43 |
| 6,249,065 B1 * | 6/2001 | Oudet et al. | 310/33 |
| 6,708,388 B1 * | 3/2004 | Yamashita et al. | 29/596 |
| 7,427,817 B2 * | 9/2008 | Uenishi et al. | 310/154.22 |
| 7,498,706 B2 | 3/2009 | Kuroda | |

(Continued)

FOREIGN PATENT DOCUMENTS

EP        339584 A1 *  11/1989
EP       2157678 A1     2/2010

(Continued)

OTHER PUBLICATIONS

Ferrite Magnet, Wikipedia, Jan. 7, 2013, pp. 1-4.*

(Continued)

*Primary Examiner* — Thomas Truong
(74) *Attorney, Agent, or Firm* — Muncy, Geissler, Olds & Lowe PC

(57) ABSTRACT

An electric machine has a stator and a rotor. The stator has a housing and at least one pair of magnetic poles. Each magnetic pole has a primary magnet and two auxiliary magnets disposed on respective sides of the primary magnet. All of the magnets are disposed on an inner surface of the housing. All the magnets of a magnetic pole have the same polarity.

13 Claims, 2 Drawing Sheets

(56) References Cited

U.S. PATENT DOCUMENTS

| | | | |
|---|---|---|---|
| 7,528,515 B2 | 5/2009 | Kuroda | |
| 2007/0075602 A1 | 4/2007 | Nakano et al. | |
| 2009/0134729 A1 | 5/2009 | Kuroda | |
| 2010/0033036 A1* | 2/2010 | Ortt et al. | 310/50 |

FOREIGN PATENT DOCUMENTS

| | | | | |
|---|---|---|---|---|
| JP | 52-168212 | | 12/1977 | |
| JP | 60-167637 A | | 8/1985 | |
| JP | 7059322 A | | 3/1995 | |
| JP | 9-224337 A | | 3/1997 | |
| JP | 10201206 A | | 7/1998 | |
| JP | 11-103552 | | 4/1999 | |
| JP | 2005020914 A | * | 1/2005 | H02K 1/17 |

OTHER PUBLICATIONS

Machine Translation, JP 2005-020914, Jan. 20, 2005.*

* cited by examiner

ELECTRIC MACHINE HAVING MAGNETIC POLES INCLUDING A PRIMARY MAGNET AND AUXILIARY MAGNETS

CROSS REFERENCE TO RELATED APPLICATIONS

This non-provisional patent application claims priority under 35 U.S.C. §119(a) from Patent Application No. 201010130858.1 filed in The People's Republic of China on Mar. 22, 2010.

FIELD OF THE INVENTION

This invention relates to an electric motor and in particular, to an electric machine with a permanent magnet stator having magnetic poles comprising a plurality of magnets.

BACKGROUND OF THE INVENTION

Japanese Published Patent Application No 10-201206 shows a stator for an electric motor. The stator comprises a housing with two arcuate sides and two magnetic poles. Each magnetic pole is composed of one large arcuate magnet which is fixed to an inner surface of a corresponding arcuate side of the housing.

However, the manufacture of large arcuate magnets is complicated. The arcuate magnets are formed as rectangular magnets which are then cut to shape. Thus there is a lot of material wastage plus there are breakages when cutting the magnets resulting in a low efficiency of material usage.

SUMMARY OF THE INVENTION

Hence there is a desire for an electric machine having an improved stator using magnets which are easier to manufacture and with a higher efficiency of material usage.

Accordingly, in one aspect thereof, the present invention provides an electric machine, comprising a stator and a rotor, the stator comprising: a housing having an inner surface; and a plurality of magnets disposed at the inner surface of the housing, the magnets forming at least one pair of magnetic poles, wherein each magnetic pole comprises a plurality of adjacent magnets with the same polarity.

Preferably, each magnetic pole comprises a primary magnet and two auxiliary magnets respectively located at opposite sides of the primary magnet.

Preferably, the housing comprises a plurality of side portions and connecting portions, each connecting portion connecting two adjacent side portions, the primary magnets being disposed at the inner surface of a corresponding side portion and the auxiliary magnets being located at the inner surface of a corresponding connecting portion.

Preferably, the radially outer surface of each primary magnet conforms to the inner surface of the corresponding side portion and is substantially flat.

Preferably, the housing has a substantially square cross section and comprises four side portions and four connecting portions, each connecting portion forming a corner connecting two adjacent side portions.

Preferably, the thickness of the auxiliary magnets is greater than the thickness of the primary magnets, and the primary magnets have a better magnetic performance than the auxiliary magnet.

Preferably, the primary magnets are made of rare-earth material and the auxiliary magnets are made of ferrite material.

Preferably, an inner surface of each of the auxiliary magnets is curved and cooperatively form there between a cylindrical space for the rotor; and the minimum diametrical distance between inner surfaces of the primary magnets is not less than the diameter of the cylindrical space.

Preferably, the radially inner surfaces of the primary magnets and the auxiliary magnets are curved, the radius of curvature of the inner surfaces of the primary magnets being substantially equal to the radius of curvature of the inner surfaces of the auxiliary magnets.

Preferably, the primary and auxiliary magnets have the same structure and are made of the same material.

Preferably, inner surfaces of the side portions and the connecting portions are substantially flat and the radially outer surfaces of the magnets conform to the inner surfaces of the side portions and the connecting portions.

Preferably, the magnets are made of ferrite material or rare-earth material.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
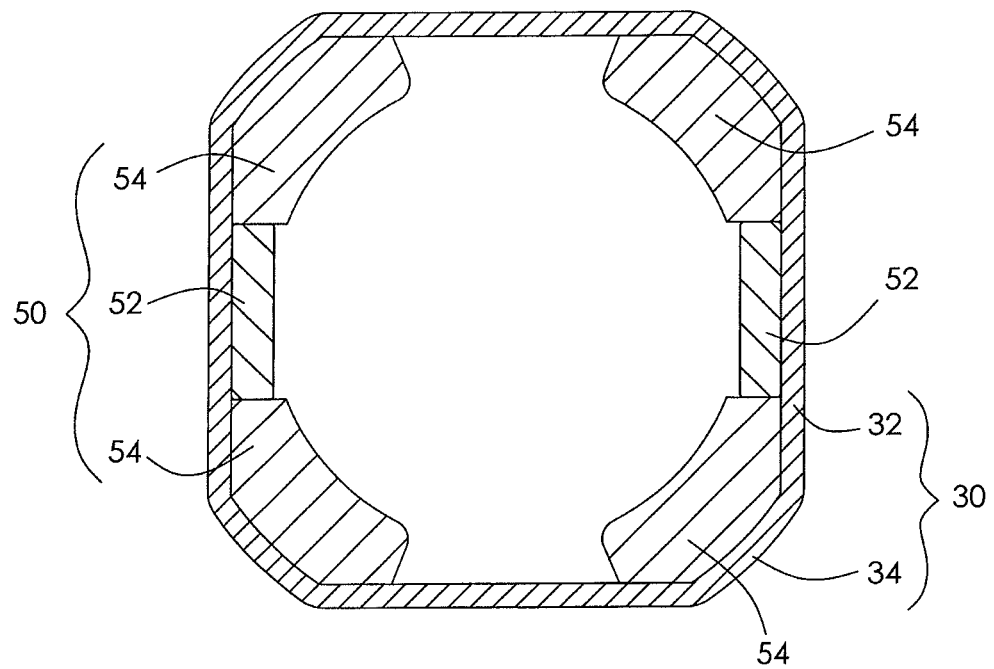
FIG. 1 is a schematic view of a stator of an electric machine in accordance with a first embodiment of the present invention.

FIG. 1 is a schematic illustration of a stator of an electric machine in accordance with a first embodiment of the present invention. The electric machine may be an electric motor which converts electrical energy to mechanical energy or an electric generator which converts mechanical energy to electrical energy. The stator comprises a housing 30 and a pair of magnetic poles 50 formed by magnets 52, 54 fitted to an inner surface of the housing 30. The magnets 52, 54 are polarized in radial directions of the housing 30. Thus the stator may be described as a two pole stator.

Preferably, the housing 30 has a square cross section and comprises four side portions 32 and four connecting portions 34 each of which connects two adjacent side portions 32. Preferably, the inner surfaces of the side portions 32 are flat while the inner surfaces of the connecting portions 34 are curved. The thickness of the housing may be uniform or non-uniform.

Each magnetic pole 50 is formed from a plurality of separate magnets, in particular by a primary magnet 52 installed at one of the parallel side portions 32 and two auxiliary magnets 54 installed at adjacent connecting portions 34, respectively.

Each primary magnet 52 is located between a pair of adjacent auxiliary magnets 54 which have the same polarity as the primary magnet 52. Thus, the two adjacent auxiliary magnets 54 with the same polarity and the corresponding primary magnet 52 located between the two adjacent auxiliary magnets 54 cooperatively form a stator magnetic pole 50. Preferably, the polarity of a first of the magnetic poles is the opposite the polarity of the other magnetic pole.

Preferably, the primary magnets 52 are made of rare-earth material and the auxiliary magnets 54 are made of ferrite. The outer surfaces of the auxiliary magnets 54 conform to the inner surfaces of the connecting portions 34. The center of the curved inner surfaces of the auxiliary magnets 54 may be coaxial with the center of the housing 30. Alternatively, the center of the curved inner surfaces of the auxiliary magnets 54 may be offset from the center of the housing 30. Preferably, the radially inner and outer surfaces of the primary magnet 52 are flat. The primary magnet 52 has a uniform thickness which is smaller than the minimum thickness of the auxiliary magnets 54. The material for the auxiliary magnets 54 is cheap and the material for the primary magnets has good magnetic performance, such as a high magnetic energy density. The thicker auxiliary magnet 54 made of cheaper material combining with the thinner primary magnets 52 made of material with good magnetic performance can meet design requirements with reduced cost.

Preferably, opposite ends of each primary magnet 52 are located in close proximity or in contact with the two adjacent auxiliary magnets 54 such that the magnetic flux passes continuously through adjacent auxiliary and primary magnets 54, 52.

Figure 2:
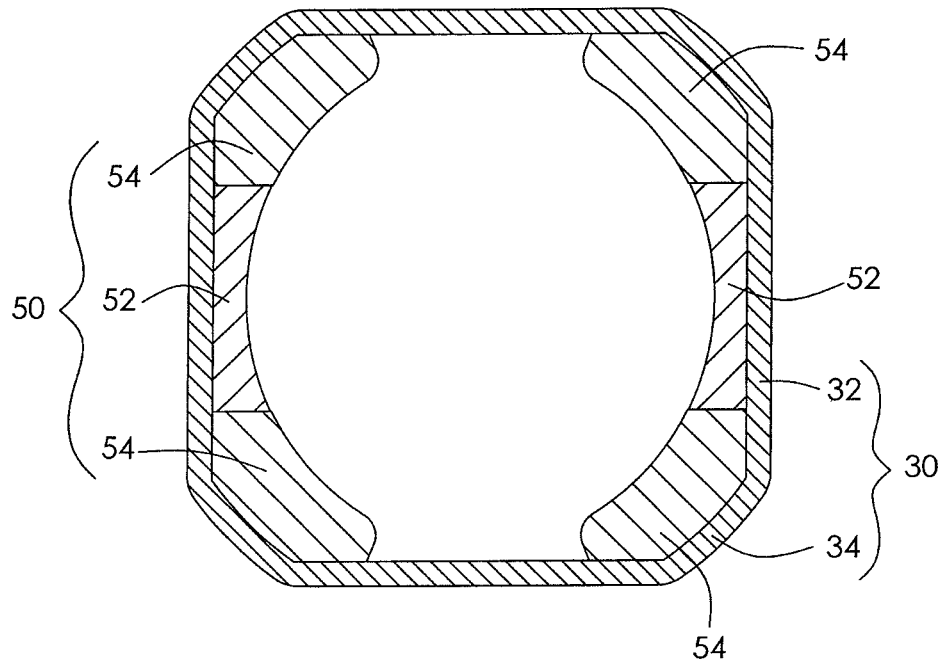
FIG. 2 is a schematic view of a stator of an electric machine in accordance with a second embodiment of the present invention.

Alternatively, the inner surfaces of the primary magnets 52 may be curved, as shown in FIG. 2. The radius of the inner surfaces of the primary magnets 52 is equal to or less than that of the inner surfaces of the auxiliary magnets 54.

In the above-mentioned embodiments, the thinner primary magnets 52 are installed at the side portions 32 of the housing 30 while the thicker auxiliary magnets 54 are installed at the connecting portions 34 of the housing 30. The inner surfaces of the auxiliary magnets 54 cooperatively form there between a cylindrical space configured for accommodating a rotor (not shown) of the electric machine. The minimum radial distance between the inner surfaces of the primary magnets 52 is not less than the maximum radius of the space.

Figure 3:
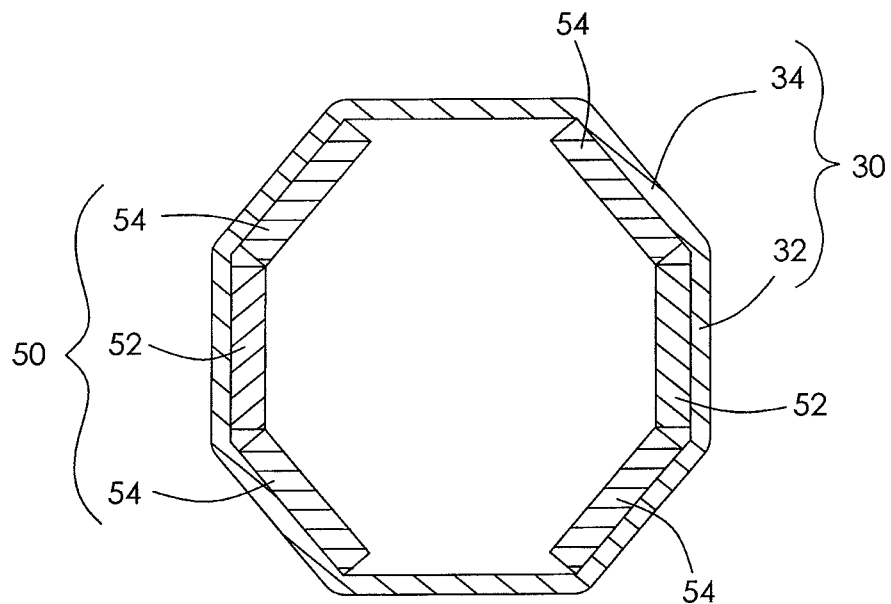
FIG. 3 is a schematic view of a stator of an electric machine in accordance with a third embodiment of the present invention.

FIG. 3 shows a stator in accordance with a third embodiment of the present invention. The inner surfaces of the side portions 32 and connecting portions 34 of the housing 30 are substantially flat. Each magnetic pole 50 comprises three flat magnets 52, 54 respectively installed at one side portion 32 and two adjacent connecting portions 34. Preferably, all magnets 52, 54 have the same structure and can be made of the same material by the same tool, which results in high efficiency of material usage and low cost. The magnets 52, 54 may be made of ferrite or rare-earth material. Preferably, each of the magnets has a rectangular cross section.

Figure 4:
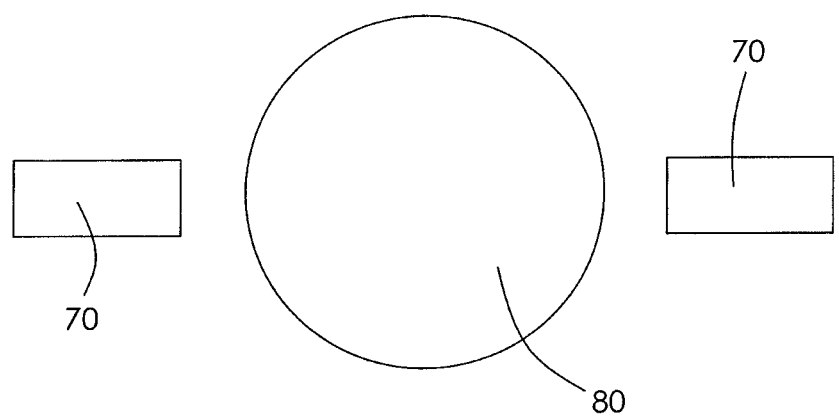
FIG. 4 is a schematic illustration of brushes of a stator and a commutator of a rotor of an electric machine according to the present invention.

FIG. 4 is a schematic illustration of a commutation arrangement of the electric machine. The stator 10 further comprises two brushes 70 configured to slidably contact a commutator 80 of the rotor. The two brushes 70 are respectively disposed at opposite sides of the commutator 80 with an angle of 180 mechanical degrees.

In the present invention, each magnetic pole is made of several small magnets which may be easily made with a high efficiency of material usage. The middle or primary magnet located between adjacent auxiliary magnets may improve the magnetic performance of the stator by increasing the homogeneity of the magnetic field.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, while the examples show only a two pole stator, the stator may have 2 n magnetic poles such as: four poles, six poles etc.

The invention claimed is:

1. An electric machine, comprising a stator and a rotor received in the stator, the stator comprising:
   a housing having an inner surface; and
   two permanent magnetic poles having opposite polarities and attached to opposite sides of the inner surface of the housing, each magnetic pole comprises:
   a primary magnet made of a rare-earth material; and
   two auxiliary magnets made of a ferrite material and at opposite sides of the primary magnet,
   wherein the primary magnet and the auxiliary magnets are polarized in radial directions of the housing,
   wherein each of the two auxiliary magnets in one of the two magnetic poles has curved radially inner surface,
   wherein the curved radially inner surfaces of the auxiliary magnets cooperatively define a cylindrical space,
   wherein each of the two primary magnets has a flat radially inner surface parallel with each other, and
   wherein the primary magnet has a uniform thickness that is a smaller than a minimum thickness of the auxiliary magnets, the auxiliary magnets having a non-uniform thickness, in the polarized direction and a distance between the flat inner surfaces of the primary magnets is greater than a diameter of the cylindrical space.

2. The machine of claim 1, wherein in one of the two magnetic poles, the primary magnet abuts against the two auxiliary magnets.

3. The machine of claim 1, wherein in one of the two magnetic poles, the primary magnet has a cross section smaller than each of the two auxiliary magnets.

4. The machine of claim 1, wherein the housing has a substantially square cross section with truncated corners and comprises four side portions and four connecting portions each forming one of the truncated corners connecting adjacent side portions.

5. The machine of claim 4, wherein:
   the primary magnet in one of the two magnetic poles is attached to one of the four side portions; and
   the two auxiliary magnets in one of the two magnetic poles are respectively attached to two adjacent connecting portions located at opposite sides of the side portion.

6. The machine of claim 5, wherein:
   each of the four side portions has a flat inner surface;
   the primary magnet in one of the two magnetic poles has a radially outer surface; and
   the radially outer surface of the primary magnet conforms to the flat inner surface of the side portion.

7. The machine of claim 6, wherein:
   each of the four connecting portions has a curved inner surface;
   in one of the two magnetic poles, each of the two auxiliary magnets has a radially outer surface; and the radially outer surfaces of the auxiliary magnets conform to the curved inner surfaces of the connecting portions.

8. A stator of an electric machine, comprising:
a housing having a substantially square cross section with truncated corners and comprising four side portions each having an inner surface and four connecting portions each having an inner surface and forming one of the truncated corners connecting adjacent side portions; and
two permanent magnetic poles having opposite polarities and arranged opposite to each other, each magnetic pole comprising a primary magnet attached to the inner surface of one of the side portions and two auxiliary magnets respectively attached to the inner surfaces of two connecting portions located at opposite sides of the side portion,
wherein the primary magnet and the auxiliary magnets polarized in radial directions of the housing,
wherein the primary magnet is made of a rare-earth material and the two auxiliary magnets are made of a ferrite material,
wherein each of the two auxiliary magnets in one of the two magnetic poles has curved radially inner surface,
wherein the curved radially inner surfaces of the auxiliary magnets cooperatively define a cylindrical space,
wherein each of the two primary magnets has a flat radially inner surface parallel with each other, and
wherein the primary magnet has a uniform thickness that is smaller than a minimum thickness of the auxiliary magnets, the auxiliary magnets having a non-uniform thickness, in the polarized direction and a distance between the flat inner surfaces of the primary magnets is greater than a diameter of the cylindrical space.

9. The stator of claim 8, wherein in one of the two magnetic poles, the primary magnet abuts against the two auxiliary magnets.

10. The stator of claim 8, wherein in each of the two magnetic poles, the primary magnet has a cross section smaller than the each of the two auxiliary magnets.

11. The stator of claim 8, wherein:
the inner surface of each of the four side portions is flat;
the primary magnet in one of the two magnetic poles has a radially outer surface; and
the radially outer surface of the primary magnet conforms to the flat inner surface of the side portion.

12. The stator of claim 11, wherein:
the inner surface of each of the four connecting portions is curved;
each of the two auxiliary magnets in one of the two magnetic poles has a radially outer surface; and
the radially outer surfaces of the auxiliary magnets conform to the curved inner surfaces of the connecting portions.

13. An electric machine, comprising a stator and a rotor received in the stator, the stator comprising:
a housing having a square cross section with four side portions and four connecting portions each of which connects two adjacent side portions, said four connecting portions being respectively located at corners of the square cross section; and
two permanent magnetic poles having opposite polarities and attached to opposite sides of an inner surface of the housing, each permanent magnetic pole comprising:
a primary permanent magnet made of a first material and attached to one of the side portions; and
two auxiliary permanent magnets made of a second material, and attached to corresponding connecting portions at opposite sides of the primary magnet and each having a minimum thickness,
wherein the primary magnet and the auxiliary magnets are polarized in radial directions of the housing,
wherein the first material has a higher magnetic energy density than the second material and the minimum thickness of the each of the two auxiliary magnets is greater than the thickness of the primary magnet in the polarized direction, and
wherein the primary magnet has a uniform thickness and the auxiliary magnets have a non-uniform thickness.

* * * * *